United States Patent

Banasiak et al.

(10) Patent No.: US 9,600,525 B1
(45) Date of Patent: Mar. 21, 2017

(54) METHOD FOR JOINING TABLES USING A LIMITED AMOUNT OF MEMORY

(71) Applicant: International Business Machines Corporation, Armonk, NY (US)

(72) Inventors: Maciej Banasiak, Marki (PL); Michal Dudziak, Warsaw (PL); Anna Przybylko, Warsaw (PL); Mariusz Rokicki, Marki (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/951,919

(22) Filed: Nov. 25, 2015

(51) Int. Cl.
*G06F 7/00* (2006.01)
*G06F 17/30* (2006.01)

(52) U.S. Cl.
CPC .... *G06F 17/30498* (2013.01); *G06F 17/3033* (2013.01); *G06F 17/30292* (2013.01); *G06F 17/30339* (2013.01)

(58) Field of Classification Search
USPC .................... 707/705, 698, 714, 718, 747
See application file for complete search history.

(56) References Cited

U.S. PATENT DOCUMENTS

| | | | | |
|---|---|---|---|---|
| 5,873,074 A * | 2/1999 | Kashyap | ............ | G06F 17/30498 |
| 6,253,197 B1 * | 6/2001 | Lindsay | ............ | G06F 17/30498 |
| | | | | 707/769 |
| 6,775,666 B1 * | 8/2004 | Stumpf | ............. | G06F 17/30663 |
| 6,775,681 B1 * | 8/2004 | Ballamkonda | .... | G06F 17/30454 |
| | | | | 707/718 |
| 6,778,976 B2 * | 8/2004 | Haas | ................ | G06F 17/30469 |
| 6,944,633 B1 * | 9/2005 | Higa | ................ | G06F 17/30498 |
| 7,085,769 B1 * | 8/2006 | Luo | .................... | G06F 17/30445 |
| 7,650,357 B2 * | 1/2010 | Lin | .................... | G06F 17/30448 |
| | | | | 707/999.102 |
| 7,685,193 B2 * | 3/2010 | Cohen | ............... | G06F 17/30498 |
| | | | | 707/714 |
| 8,290,933 B2 * | 10/2012 | Miao | ................. | G06F 17/30454 |
| | | | | 707/714 |

(Continued)

OTHER PUBLICATIONS

"Understanding Hash Joins: SQL Server 2000"; https://technet.microsoft.com/en-us/library/aa178403(v=sql.80).aspx; Downloaded Jun. 15, 2015. © 2015 Microsoft. 1 page.

(Continued)

*Primary Examiner* — Daniel Kuddus
(74) *Attorney, Agent, or Firm* — Mollborn Patents, Inc.; Fredrik Mollborn (57) ABSTRACT

Joining sets of tables on a join attribute using a predefined amount of memory. A set of tables is stored on disk storage. The largest table is a streaming table. The remaining tables form a subset of tables. For each subset table, a hash table is generated, resulting in a subset of hash tables. A group of not yet joined hash tables is determined such that the size of the tables is smaller than the amount of memory. The tables are loaded to the memory. A hash join is performed between the streaming table and the group of tables, forming a temporal joined table. If the subset includes a not yet joined table with the streaming table, a further set of tables with the not yet joined and the temporal joined table is formed. The above operations are repeated using the further set of tables as the set of tables.

11 Claims, 2 Drawing Sheets

(56) References Cited

U.S. PATENT DOCUMENTS

| | | | |
|---|---|---|---|
| 8,352,692 B1* | 1/2013 | Jordan | H04L 67/1093 |
| | | | 711/162 |
| 8,805,850 B2 | 8/2014 | Sukhwani et al. | |
| 9,292,560 B2* | 3/2016 | Attaluri | G06F 17/30339 |
| 2005/0234841 A1* | 10/2005 | Miao | G06F 17/30454 |
| 2010/0082648 A1* | 4/2010 | Potapov | G06F 3/0611 |
| | | | 707/756 |
| 2011/0238659 A1* | 9/2011 | Chittar | G06F 17/3025 |
| | | | 707/724 |
| 2011/0314031 A1* | 12/2011 | Chittar | G06F 17/3025 |
| | | | 707/749 |
| 2012/0036123 A1* | 2/2012 | Hasan | G06F 17/30386 |
| | | | 707/723 |
| 2013/0159298 A1* | 6/2013 | Mason | G06F 17/30867 |
| | | | 707/728 |
| 2014/0214855 A1* | 7/2014 | Attaluri | G06F 17/30339 |
| | | | 707/747 |
| 2014/0371407 A1* | 12/2014 | Ramsay | C08F 110/02 |
| | | | 526/89 |

OTHER PUBLICATIONS

Nakayama et al.; "Hash-Partitioned Join Method Using Dynamic Destining Strategy"; Proceedings of the 14th VLDB Conference, Los Angeles, California 1988. pp. 468-478.

Shapiro, Leonard D.; "Join Processing in Database Systems with Large Main Memories"; ACM Transactions on Database Systems, vol. 11, No. 3, Sep. 1986, pp. 239-264.

* cited by examiner

METHOD FOR JOINING TABLES USING A LIMITED AMOUNT OF MEMORY

BACKGROUND

The present invention relates to the field of digital computer systems, and more specifically, to a method for joining a set of tables on a join attribute using a limited amount of memory.

Various techniques are used by databases to perform joins of tables including hash joins. A hash join algorithm builds a hash table for one of the tables in the join relation and probes the hash table for each record of the other table in the join relation. For performance reasons it is preferable to store the hash tables of the hash-join process in memory rather than on persistent storage e.g., disk. However, the memory is limited in size compared to the persistent storages. This may cause the hash-join process to run out of memory, thereby requiring the structures to be stored on disk. This causes the performance of the queries based on the hash join process to be degraded.

SUMMARY

Various embodiments provide a method for joining a set of tables on a join attribute using a predefined amount of memory, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for joining a set of tables on a join attribute using a predefined amount of memory, the set of tables being stored on a disk storage. The largest table of the set of tables is determined to be a streaming table. The remaining tables of the set of tables form a subset of tables. For each table of the subset of tables a hash table is generated if the hash table not yet generated, resulting in a subset of hash tables. A group of not yet joined tables is determined, which includes one or more not yet joined tables of the subset of hash tables such that the size of the group of tables is smaller than (or fits into) the amount of memory. For example, the determining of the group of not yet joined tables may result in a set of groups of not yet joined tables; wherein each group of the set of groups of not yet joined tables fits into the predefined amount of memory. The determined group of tables has a number of tables that is higher than one table if there is at least one group of tables of the set of groups of not yet joined tables that comprises more than one table e.g. the determined group may be the at least one group. If there is only a single table of the subset of hash tables that fits in the predefined amount of memory, then the determined group of tables may comprise that single table. The group of tables is loaded to the memory. A hash join between the streaming table and the group of tables is performed, thereby forming a temporal joined table. In case the subset of tables includes at least one not yet joined table with the streaming table, a further set of tables is formed, which includes the at least one not yet joined table and the temporal joined table and the above steps are repeated using the further set of tables as the set of tables. In other words the repeating is performed until only the temporal joined table is left.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for joining a set of tables on a join attribute using a predefined amount of memory, the set of tables being stored on a disk storage. The computer system is configured to implement all of steps of the method according to preceding embodiments

BRIEF DESCRIPTION OF THE SEVERAL VIEWS OF THE DRAWINGS

In the following, embodiments of the invention are explained in greater detail, by way of example, making reference to the drawings in which.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The join operation is one of the expensive but fundamental query operations. It is computationally expensive and difficult to optimize. The present method may have the advantage of increasing the performance of the queries based on the hash join process. This may for example speed up the hash join process compared to conventional methods. In particular, the present method may provide an optimal and efficient usage of the available memory in order to effectively exploit the main memory. This may speed up the hash join process.

By selecting tables such that they fit entirely into main memory, the hash joins perform only a small number of scans of the tables to be joined. This is in contrast to the case where there is no constraint on the memory usage of the inner tables.

According to one embodiment, the determining of the group of not yet joined tables resulting in a set of groups of not yet joined tables, further comprising: selecting one group of the set of groups as the determined group of step c) in case the selected group has the maximum number of tables among the set of groups.

This may be advantageous in case the hash join process is limited or required for a predefined number of tables e.g. for test purpose or for a selective analysis. For example, the user may decide to test the joining operation on 10 tables out of 100 tables. In this case, the selection based on a maximum number of tables may be more convenient and faster. Thus having the maximum number of tables in the selected group may further speed up the hash join process, and thus may save processing resources.

According to one embodiment, the determining of the group of not yet joined tables resulting in a set of groups of not yet joined tables, further comprising: selecting one group of the set of groups as the determined group of step c) in case the selected group has the maximum size among the set of groups.

This may enable a maximal usage of the available memory while processing a large portion of the tables that need to be processed.

According to one embodiment, the method further comprises: determining elimination factors for the subset of tables, each eliminating factor indicating a percentage of expected record matches between the respective table of the subset of tables and the streaming table on the join attribute; wherein the hash join is performed (or the determining of the group of tables) using the elimination factors. Each hash table of the subset of has tables is assigned or has or associated with the elimination factor of the respective table (of the subset of tables) from which the hash table is created or generated.

Each table t of the subset of tables (or of the subset of hash tables) may be assigned a respective elimination factor $0 <= x(t) < 1$ e.g. when joined with the streaming table. The elimination factor can be computed based on statistics e.g. on the set of tables. The elimination factor $x(t)$ of table t estimates number of expected record matches between the streaming table and table t. In other words, the elimination factor may refer to the ratio of the number of tuples or records retrieved from a table to the total number of tuples in that table.

More precisely, if the streaming table S contains m records then one can expect that join returns $m*x(t)$ records. The weight of table t may be its elimination factor $x(t)$.

For example, the elimination of the records from the streaming table may be independent. That is, the expected number of records returned from joining S with two tables $t\_1$ and $t\_2$ is equal to $|S|*x(t\_1)*x(t\_2)$, where $x(t\_1)$ and $x(t\_2)$ are elimination factors for the tables $t\_1$ and $t\_2$ respectively.

Using the elimination factors, the size of the output table (the temporal join table) may be minimized after each iteration and the memory utilization may be maximized.

Using the elimination factors, tables to be hashed into memory may be chosen (e.g. in order to determine the group of tables) so that the product of the elimination factors of the chosen tables is minimized and memory constraints are met. In this way the expected size of the output table (of the join) may be minimized. For example, the problem of selecting the group of tables so that their total size do not exceed the predefined memory amount and product of their elimination factors is minimized can be solved with dynamic programming.

Considering for exemplification purpose that M is the predefined memory amount and $\{t\_1, t\_2, \ldots, t\_n\}$ set of tables to be hashed. $T[M,i]$ is the minimum product of elimination factors of tables selected from set $\{t\_1, \ldots, t\_i\}$ so that their size do not exceed memory amount M.

Initially $T[0, i]=1$ for $i=1, \ldots, n$ since the memory amount is 0 so all the records from the streaming table will be returned.

$$T[M,i]=\min(T[M-sizeof(t\_i),i-1]*x(t\_i),T[M,i-1])$$

There can be two possibilities for $T[M,i]$ either $t\_i$ is selected in such case the minimum product is equal to $T[M-sizeof(t\_i), i-1]*x(t\_i)$ or if the $t\_i$ is not selected then minimum product is equal to $T[M,i-1]$. Minimum may be taken from both possibilities.

The present method may work if all $x(t\_i)<1$. In case $x(t\_i)>=1$ for some i a weight $w(t\_i)=1/x(t\_i)$ may be used. Dynamic programming may be used to maximize total weight of hashed tables in a single iteration. This way tables with small elimination factor may be used to avoid data ballooning and to maximize memory utilization.

Considering that the predefined memory amount is of 10 blocks. There are 4 tables: t0 of size 30, t1 of size 4, t2 of size 7, t3 of size 5. In this case t0 is the streaming table since it is the largest table. Considering the following elimination factors: $x(t1)=0.7$, $x(t2)=0.8$, $x(t3)=0.9$.

The present method may compute optimal order that minimizes number of tmp table and minimizes the size of tmp tables by for example:

1) t0 joined with t1 and t3 (t1 and t3 achieves the minimum product and meets memory constraints)→tmp1 (mem util 9), expected size of the tmp1 is $30*0.7*0.9=18.9$.

2) tmp1 joined with t2→tmp3 (mem util 7), expected size of the output table tmp3 is $18.9*0.7=15.12$.

This may have for example the advantage of controlling the joining process as explained with the below embodiments.

According to one embodiment, the determining of the group of not yet joined tables resulting in a set of groups of not yet joined tables, further comprising: selecting one group of the set of groups as the determined group of step c), wherein the selected group having the smallest product of the elimination factors of the tables of the selected group.

This may have the advantage of efficiently using the processing resources in that most of comparisons performed by the join operation may generate a result tuple. This is in contrast to a higher value of the product which would mean that a higher number of comparisons may be wasteful as it does not generate result tuples.

According to one embodiment, the method further comprises: calculating for each group of tables of the set of groups of tables a weighed sum of the product of elimination factors of the group and the size of the group, wherein the selected group has the highest weighted sum; e.g. having the highest possible size and the smallest product.

A smaller value of the product may have the advantage of generating an intermediate smaller sized joined tables which may further speed up the hash join process as there may be more available memory space for the intermediate tables.

Further the size of the group of tables may be relevant when trying to optimally use the available space in the memory.

Therefore finding a balance between the value of the product and the size of the group of tables may provide an optimal balance for saving the resources.

According to one embodiment, the elimination factors are determined based on a selection criterion on the join attribute. For example, in this case the elimination factor may indicate percentage of expected record matches between the respective table and the current streaming, wherein the record matches further satisfy the selection criterion.

For example, the user may be interested only on a portion of data e.g. data for a given time period. This may save storage and processing time as only a portion of the tables may be joined.

According to one embodiment, the elimination factors are determined at runtime for each streaming table. For example, the elimination factor of a table to be joined with the streaming table may be determined by scanning a portion of the two tables that may provide an estimation of the number of records that match in the two tables.

According to one embodiment, the elimination factors are selected from a group of predefined elimination factors.

For example, for each pair of tables of the set of tables elimination factors may be provided before starting the joining operation. In this case, for every streaming table the elimination factors may be selected from those predefined ones.

According to one embodiment, the loading of the group of tables to the memory is performed in a predefined order, wherein the order comprises a random order or an order determined based on the size of the group of tables.

For example, the method may join two or more tables, and then joins the result to a one or more third tables, and then joins this result to one or more fourth table, and so on. This process continues until all tables are joined into the result.

Figure 1:
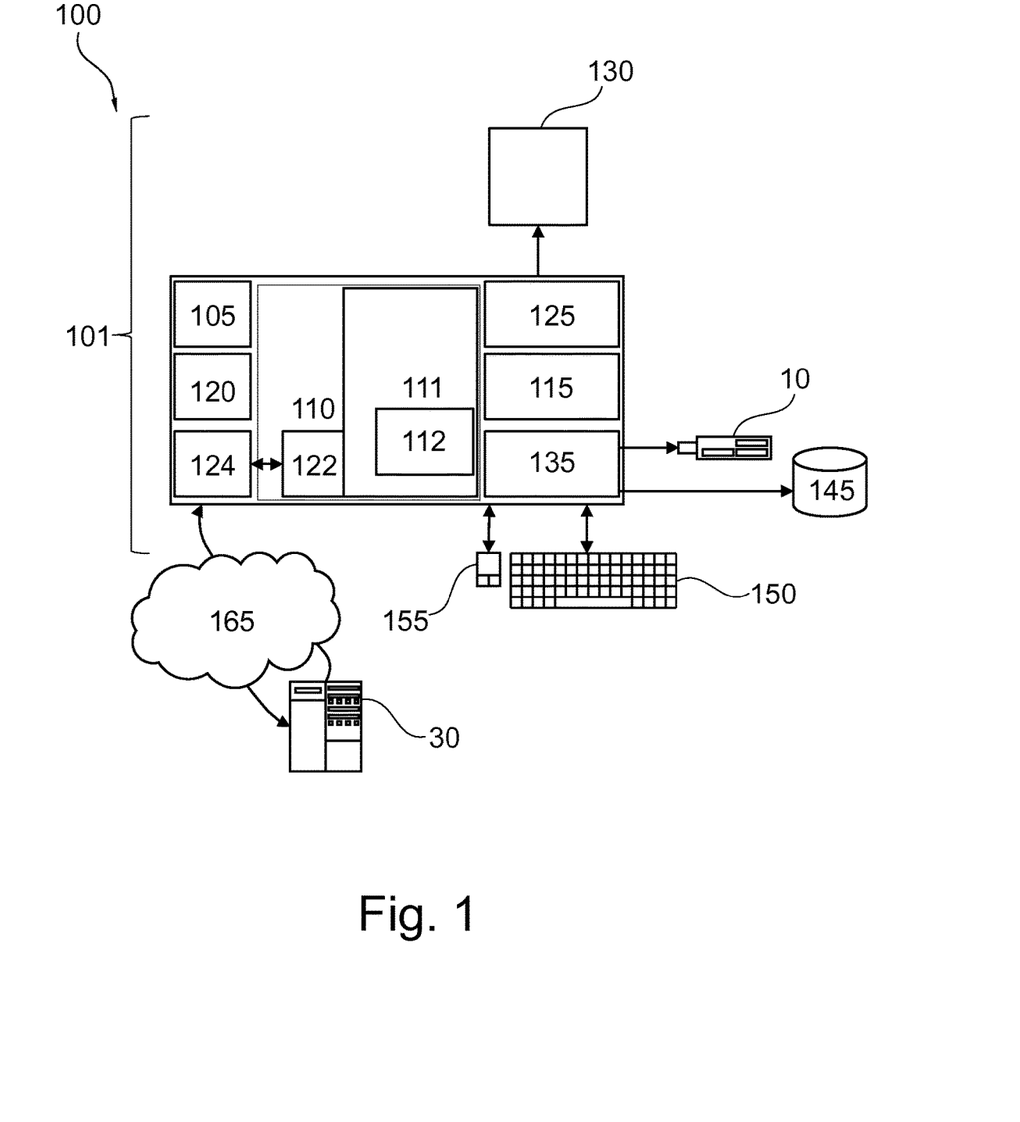
FIG. 1 represents a computer system, suited for implementing one or more method steps as involved in the present disclosure.

FIG. 1 represents a general computerized system, suited for implementing method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 for implementing method for identifying dependencies between components.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method.

Figure 2:
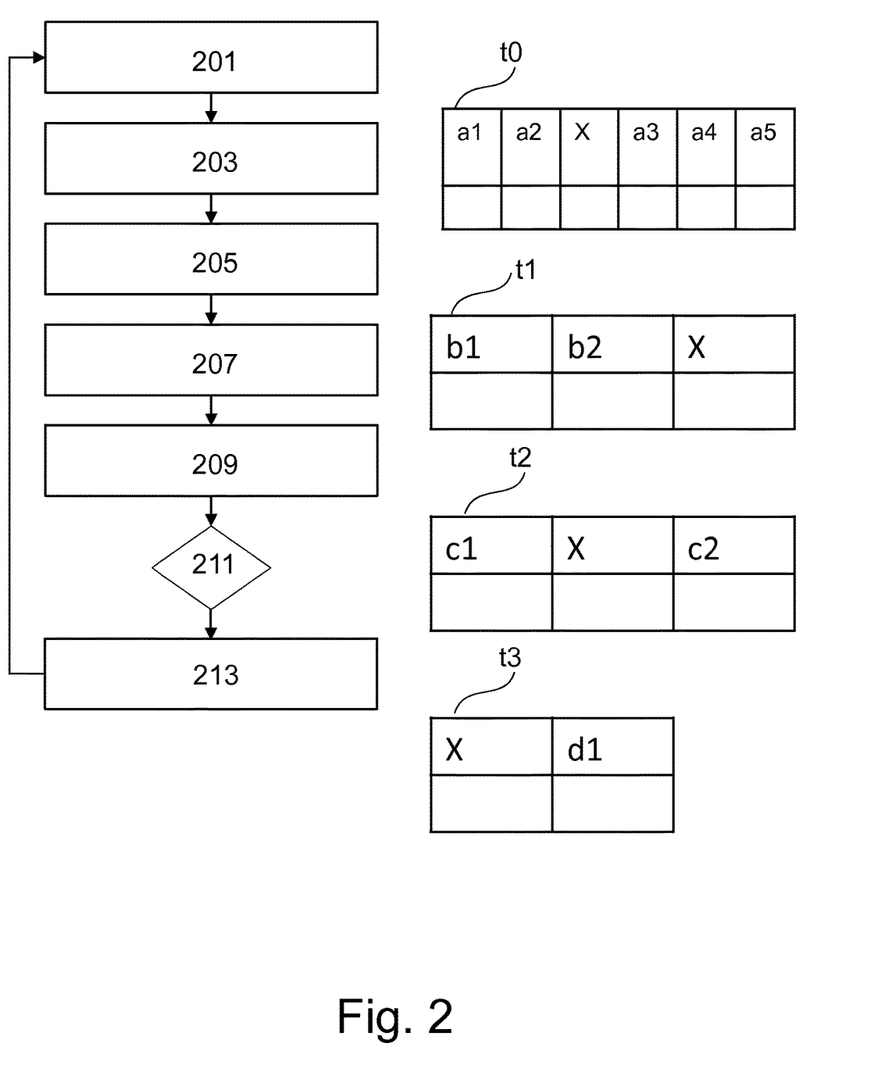
FIG. 2 is a flowchart of a method for joining a set of tables on a join attribute using a predefined amount of memory.

FIG. 2 is a flowchart of a method for joining a set of tables on a join attribute using a predefined amount of memory (e.g. predefined amount of main memory) e.g. of memory 110. The set of tables is stored on a disk storage e.g. persistent storage.

The memory 110 may for example comprise a main memory of a computer system e.g. 100 that may or may not comprise the disk storage.

The set of tables may for example comprise a plurality of tables. The plurality of tables may have at least the joint attribute as common attribute between them.

The predefined amount of memory may be the available memory or the free memory available at the time of performing the present method. In another example, the predefined amount of memory may be a portion of the memory assigned or allocated to the joining of the set of tables e.g. other portions of the memory may be allocated to other processes.

The term "disk" as used herein may comprise a hard disk drive (HDD), a direct access storage device (DASD) or a logical unit number (lun) in a storage device. The term "disk" is intended to embrace not only magnetic storage devices, but also optical, solid state and other types of storage devices.

As used herein, the term "table" refers to a collection of related data held in a structured format. The table consists of fields (columns), and rows (or records). Each column identifiable by an attribute or name such attributes a1-a5, X, c1-c2, b1-b2, d1 as shown in FIG. 2.

The joining may combine rows from the set of tables, based on a joining condition on a common field between them which is the join attribute. Each of the set of tables may comprise rows and columns or fields that represent respective attributes. The joining process may involve the operation or processing two tables, one table is referred to as the "streaming" or "outer" table of the join and the other table is the inner table.

As shown in FIG. 2, for exemplification purpose, the set of tables comprise 4 tables t0, t1, t2 and t3 having the common join attribute "X".

The hash join application (referred to as software 112 in FIG. 1) may receive inputs for a hash-join operation including information describing the set of tables. In another example, the hash join application 112 may have access to the set of tables e.g. as soon as the set of tables is stored or updated.

In step 201, the largest table of the set of tables (e.g. t0) may be determined or selected or identified as a streaming table. The remaining tables (t1, t2 and t3) of the set of tables form a subset of tables of the set of tables. For example, t0 has a size of 30 blocks.

This may be beneficial as the amount of available memory is usually limited and thus it may be beneficial to have remaining small tables. This may save processing resources that would otherwise be required if the largest table is to be hashed and loaded into the memory. In an alternative example, the streaming table may be randomly chosen from the set of tables. This may be beneficial in case the memory is enough for storing the set of tables and thus the time required for sorting the set of tables and selecting the largest one may be saved.

This may also decrease the number of scans of the tables to be joined in contrast to the case where a smallest table is chosen to be the streaming table.

A hash join operation involves at least two tables one of the tables is referred to as the inner table of the join and the second tables of the join is referred to as the outer table. The term "streaming table" refers to the outer table.

The streaming table is a table from which a value of the join attribute is retrieved directly e.g. by hash join application. Based on the value of the join attribute data is further retrieved from one or more other tables to be joined with the streaming table.

The streaming table may be stored on the disk while performing the joining. The largest table may be the table having the highest size e.g. in term of occupied bits or in term of blocks. The disk on which the streaming is stored may be collocated with the memory or may be remote to the computer system comprising the memory.

For example, the subset of tables (t1, t2, t3) do not fit in the memory.

In step 203, for each table of the subset of tables a hash table may be generated if not yet generated. This results in a subset of hash tables (ht1, ht2, ht3), where hti refers to the hash table of table ti. For example, each table of the subset of tables may be checked whether it is associated with a hash table (that has been created from the each table) otherwise, the hash table may be generated.

For example, generating or building the hash table may be performed using data from rows of the respective or corresponding table of the subset of tables. The hash table may comprise one or more partitions. Each partition of the one or more partitions may comprise one or more hash buckets. And each hash bucket of the one or more hash buckets is storing data from rows that map to a hash code value based on a hashing function.

Assume, for exemplification purpose, that the predefined memory amount is of 10 blocks and that ht1, ht2 and ht3 have respectively a size of 4, 7 and 5 blocks.

In step 205, a group of not yet joined tables comprising one or more not yet joined tables (ht1, ht2 and ht3) of the subset of hash tables may be determined such that the size of the group of tables is smaller than the amount of memory. For example, (ht1, ht2) and (ht1, ht3) and (ht1, ht2 and ht3) may form groups of not joined tables.

Following the above example, the group (ht1, ht2) would have a total size of 4+7=11 blocks. The group (ht1, ht3) would have a total size of 4+5=9 blocks. The group (ht1, ht2, ht3) would have a total size of 4+7+5=16 blocks. Therefore groups (ht1, ht2, ht3) and (ht1, ht2) may be excluded as their respective size exceed the predefined memory amount of 10 blocks.

For example, the determined group of step 205 may be selected from a set of groups. Each group of the set of groups may have a corresponding product of the elimination factors. The determined group of step 205 may be the group having the smallest product of the respective elimination factors.

The determining of the group of tables may ensure that an optimal e.g. maximum set of tables remain in memory before the join starts.

I step 207, the group of tables may be loaded to the memory. For example, the group of tables may be loaded in a predefined order. The order specifies the particular sequence or order that tables of the group of tables may be accessed for performing a join of the accessed table with the streaming table. The order may be an arbitrary order or randomly determined. In another example, the group of tables may be sort in an increasing or decreasing order of their size, for example, the number of blocks in the table.

In another example the order may be user defined e.g. an indication of the order may be received from the user. The receiving of the indication of the order may automatically be performed on a periodic basis e.g. every day the indication of the order may be received. Or as soon as the set of tables are stored the indication of the order may be received. In a further example, the receiving of the indication of the order may be performed in response to sending a request to the user e.g. prompting the user to input the indication of the order. The term "user" may refer to an entity e.g., an individual, a computer, or an application executing on a computer that issues requests to insert data items or performing a database search.

Even though the order may have no impact on the final result, it may affect the performance e.g. speeding up the joining process by having a systematic method for loading the tables in contrast to a random or unknown loading method.

In step 209, a hash join may be performed or processed between the streaming table and the group of tables. This may result in a temporal joined table (e.g. tmp1).

The hash join may be performed between each hash table of the group of tables and the streaming table. For example, the hash table may be probed for each record of the streaming table. All rows from the streaming table that match rows of the group of tables not stored in-memory get stored on disk as the temporal join table.

Upon processing a first hash join between the current table and the streaming table, the method may continue down the order to examine any remaining/subsequent table in the order (if any) in the group of tables, and may apply the join.

In decision block 211 it may be determined if the subset of tables (or the subset of hash join tables) comprises at least one not yet joined table e.g. t2 with the streaming table. If so, a further set of tables may be formed in step 213 comprising the at least one not yet joined table (e.g. t2) and the temporal joined table (tmp1) and steps 201)-213) may be repeated using the further set of tables as the set of tables. Otherwise the method may end.

In another example, a method for joining a set of tables on a join attribute using a limited amount of memory is provided. The method comprises: providing a set of tables stored on a disk, the set of table being a current set of tables at the beginning of the join; each iteration round of the join working on the current set of tables as follows: selecting a first table of the current set of tables as a streaming table, the first table being the largest table in the current set of tables and the rest of the tables being further tables; —determining elimination factors for the further tables, each elimination factor indicating percentage of expected record matches between the respective further table and the current streaming table on the join attribute; —determining, based on the elimination factors of the further tables and sizes of hash tables of the further tables, subsets of the further tables and in which order to load hash tables relating to subsets of the further tables to the available memory for carrying out a hash join between the current streaming table and the further tables; —loading hash tables of the first subsets of further tables to the memory in the determined order, the first subset being the first in the determined order, and, for the first subset of further tables, carrying out a hash join between the streaming table (on disk) and each of the respective further tables (on disk) using the set of hash tables loaded in the memory, [only the first subset is joined with the current streaming table; thereafter one checks which table is the largest for the next iteration round]—forming the current set of tables of the current streaming table and the further tables not yet joined with the streaming table; [preparation for the next iteration round]—continuing the iteration until only the streaming table is left in the current set of tables. [stopping criterion]

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer implemented method for joining a set of tables on a join attribute using a predefined amount of memory, the set of tables being stored on a disk storage, the method comprising:
   a) determining the largest table of the set of tables as a streaming table, the remaining tables of the set of tables forming a subset of tables;
   b) generating for each table of the subset of tables a hash table if not yet generated resulting in a subset of hash tables;
   c) determining a group of not yet joined tables comprising one or more not yet joined tables of the subset of hash tables such that the size of the group of tables is smaller than the amount of memory;
   d) assigning an elimination factor for each table in the subset of tables, each elimination factor being a ratio of the number of tuples retrieved for the table and the total number of tuples in the table, the elimination factor estimating a number of expected record matches between the respective table of the subset of tables and the streaming table on a join attribute;
   e) loading the group of tables to the memory;
   f) performing a hash join between the streaming table and the group of tables, to form a temporal joined table, the hash join being performed using the elimination factors;
   g) in response to detecting that the subset of tables comprises at least one not yet joined table with the streaming table, forming a further set of tables comprising the at least one not yet joined table and the temporal joined table and repeating steps a)-g) using the further set of tables as the set of tables.

2. The method of claim 1, the determining of the group of not yet joined tables resulting in a set of groups of not yet joined tables, further comprising: selecting one group of the set of groups as the determined group of step c), wherein the selected group having the smallest product of the elimination factors of the tables of the selected group.

3. The method of claim 1, further comprising: determining of the group of not yet joined tables resulting in a set of groups of not yet joined tables, calculating for each group of tables of the set of groups of tables a weighed sum of the product of elimination factors of the group and the size of the group, wherein the selected group has the highest weighted sum.

4. The method of claim 1, wherein the elimination factors are determined based on a selection criterion on the join attribute.

5. The method of claim 1, the elimination factors are determined at runtime for each streaming table.

6. The method of claim 1, the elimination factors are selected from a group of predefined elimination factors.

7. The method of claim 1, the determining of the group of not yet joined tables resulting in a set of groups of not yet joined tables, further comprising: selecting one group of the set of groups as the determined group of step c) in case the selected group has the maximum number of tables among the set of groups.

8. The method of claim 1, the determining of the group of not yet joined tables resulting in a set of groups of not yet joined tables, further comprising: selecting one group of the set of groups as the determined group of step c) in case the selected group has the maximum size among the set of groups.

9. The method of claim 1, the loading of the group of tables to the memory being performed in a predefined order, wherein the order comprises a random order or an order determined based on the size of the group of tables.

10. A computer program product comprising a computer-readable non-transitory storage medium having computer-readable program code embodied therewith, the computer-readable program code configured to implement a method comprising:
   a) determining the largest table of the set of tables as a streaming table, the remaining tables of the set of tables forming a subset of tables;
   b) generating for each table of the subset of tables a hash table if not yet generated resulting in a subset of hash tables;
   c) determining a group of not yet joined tables comprising one or more not yet joined tables of the subset of hash tables such that the size of the group of tables is smaller than the amount of memory;
   d) assigning an elimination factor for each table in the subset of tables, each elimination factor being a ratio of the number of tuples retrieved for the table and the total number of tuples in the table, the elimination factor estimating a number of expected record matches between the respective table of the subset of tables and the streaming table on a join attribute;
   e) loading the group of tables to the memory;
   f) performing a hash join between the streaming table and the group of tables, to form a temporal joined table, the hash join being performed using the elimination factors;
   g) in response to detecting that the subset of tables comprises at least one not yet joined table with the streaming table, forming a further set of tables comprising the at least one not yet joined table and the temporal joined table and repeating steps a)-g) using the further set of tables as the set of tables.

11. A computer system for joining a set of tables on a join attribute using a predefined amount of memory, the set of tables being stored on a disk storage, the computer system being configured for:
   a) determining the largest table of the set of tables as a streaming table, the remaining tables of the set of tables forming a subset of tables;
   b) generating for each table of the subset of tables a hash table if not yet generated resulting in a subset of hash tables;
   c) determining a group of not yet joined tables comprising one or more not yet joined tables of the subset of hash tables such that the size of the group of tables is smaller than the amount of memory;
   d) assigning an elimination factor for each table in the subset of tables, each elimination factor being a ratio of the number of tuples retrieved for the table and the total number of tuples in the table, the elimination factor estimating a number of expected record matches between the respective table of the subset of tables and the streaming table on a join attribute;
   e) loading the group of tables to the memory;
   f) performing a hash join between the streaming table and the group of tables, to form a temporal joined table, the hash join being performed using the elimination factors;
   g) in response to detecting that the subset of tables comprises at least one not yet joined table with the streaming table, forming a further set of tables comprising the at least one not yet joined table and the temporal joined table and repeating steps a)-g) using the further set of tables as the set of tables.

* * * * *